United States Patent
Hama

(10) Patent No.: US 10,171,717 B2
(45) Date of Patent: Jan. 1, 2019

(54) IMAGE CAPTURE DEVICE AND METHOD FOR CAPTURING IMAGE FOR BIOMETRIC AUTHENTICATION, BIOMETRIC AUTHENTICATION APPARATUS BASED ON DISTANCE BETWEEN IMAGE SENSOR AND FIRST PORTION OF SUBJECT

(71) Applicant: FUJITSU LIMITED, Kawasaki-shi, Kanagawa (JP)

(72) Inventor: Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 283 days.

(21) Appl. No.: 14/317,481

(22) Filed: Jun. 27, 2014

(65) Prior Publication Data

US 2015/0029319 A1    Jan. 29, 2015

(30) Foreign Application Priority Data

Jul. 25, 2013    (JP) .................................. 2013-154839

(51) Int. Cl.
*H04N 5/232*    (2006.01)
*G06K 9/00*    (2006.01)

(52) U.S. Cl.
CPC ......... *H04N 5/232* (2013.01); *G06K 9/00013* (2013.01); *G06K 9/00033* (2013.01); *G06K 9/00912* (2013.01)

(58) Field of Classification Search
CPC . G06K 9/00013; G06K 9/00912; H04N 5/232
USPC ........................................... 348/77; 382/115
See application file for complete search history.

(56) References Cited

U.S. PATENT DOCUMENTS

| | | | |
|---|---|---|---|
| 6,879,710 B1 * | 4/2005 | Hinoue | G06F 21/32 340/5.53 |
| 2005/0104968 A1 | 5/2005 | Aoki et al. | |
| 2005/0148876 A1 * | 7/2005 | Endoh | A61B 5/117 600/454 |
| 2005/0286744 A1 | 12/2005 | Yoshizu et al. | |

(Continued)

FOREIGN PATENT DOCUMENTS

| | | |
|---|---|---|
| JP | 2006-011988 | 1/2006 |
| JP | 2006-252034 | 9/2006 |

(Continued)

OTHER PUBLICATIONS

Extended European Search Report dated May 21, 2015 in related European Application No. 14175200.6.

*Primary Examiner* — Jamie J Atala
*Assistant Examiner* — James T Boylan
(74) *Attorney, Agent, or Firm* — Staas & Halsey LLP

(57) ABSTRACT

An image capture device includes a casing, an image sensor provided to a surface of the casing, and a processor configured to: detect a location with which a subject is in contact on the surface, and cause the image sensor to perform image capture processing when a distance between a first portion of the subject and the image sensor meets a certain criterion, the first portion being different from a second portion of the subject, the second portion being in contact with the surface in the location, wherein the certain criterion is set based on first distance information indicating a first distance between the location and the image sensor and second distance information indicating a second distance between a certain location on the surface and the image sensor.

17 Claims, 6 Drawing Sheets

(56) References Cited

U.S. PATENT DOCUMENTS

| | | | |
|---|---|---|---|
| 2006/0023919 A1 | 2/2006 | Okamura et al. | |
| 2006/0228004 A1 | 10/2006 | Sato | |
| 2006/0290781 A1 | 12/2006 | Hama | |
| 2007/0196096 A1 | 8/2007 | Naruse | |
| 2008/0107309 A1* | 5/2008 | Cerni | G06K 9/00033 382/115 |
| 2009/0093727 A1* | 4/2009 | Sato | A61B 5/117 600/476 |
| 2013/0027184 A1* | 1/2013 | Endoh | G06K 9/00013 340/5.83 |
| 2013/0127709 A1* | 5/2013 | Spielberg | G06F 3/04847 345/157 |
| 2013/0243264 A1 | 9/2013 | Aoki | |
| 2015/0324566 A1* | 11/2015 | Miura | G06K 9/0004 726/19 |

FOREIGN PATENT DOCUMENTS

| | | |
|---|---|---|
| JP | 2007-010346 | 1/2007 |
| JP | 2007-215952 | 8/2007 |
| JP | 2007-233981 | 9/2007 |
| JP | 2012-208687 | 10/2012 |
| WO | WO 2004/084140 | 9/2004 |
| WO | 2012/014304 A1 | 2/2012 |
| WO | WO 2012014304 * | 2/2012 |
| WO | 2013/069372 A1 | 5/2013 |

* cited by examiner

IMAGE CAPTURE DEVICE AND METHOD FOR CAPTURING IMAGE FOR BIOMETRIC AUTHENTICATION, BIOMETRIC AUTHENTICATION APPARATUS BASED ON DISTANCE BETWEEN IMAGE SENSOR AND FIRST PORTION OF SUBJECT

CROSS-REFERENCE TO RELATED APPLICATION

This application is based upon and claims the benefit of priority from the prior Japanese Patent Application No. 2013-154839, filed on Jul. 25, 2013, the entire contents of which are incorporated herein by reference.

FIELD

The technique discussed in the embodiment is related to an image capture device and an image capture method.

BACKGROUND

Japanese Laid-open Patent Publication No. 2007-233981 and Japanese Laid-open Patent Publication No. 2012-208687 discuss techniques using biometric authentication. There are scenes where biometric authentication is used to ensure security in mobile equipment, such as a notebook personal computer or a tablet terminal.

SUMMARY

According to an aspect of the invention, an image capture device includes a casing, an image sensor provided to a surface of the casing, and a processor configured to: detect a location with which a subject is in contact on the surface, and cause the image sensor to perform image capture processing when a distance between a first portion of the subject and the image sensor meets a certain criterion, the first portion being different from a second portion of the subject, the second portion being in contact with the surface in the location, wherein the certain criterion is set based on first distance information indicating a first distance between the location and the image sensor and second distance information indicating a second distance between a certain location on the surface and the image sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Biometric information input in biometric authentication includes fluctuations resulting from a state at the time of input (e.g., a way in which a hand is held). The fluctuations are a cause of a reduction in authentication accuracy.

It is an object of the technique discussed in the embodiment to suppress a reduction in authentication accuracy in biometric authentication.

An embodiment is described below with reference to the drawings.

Embodiment 1

Figure 1A:
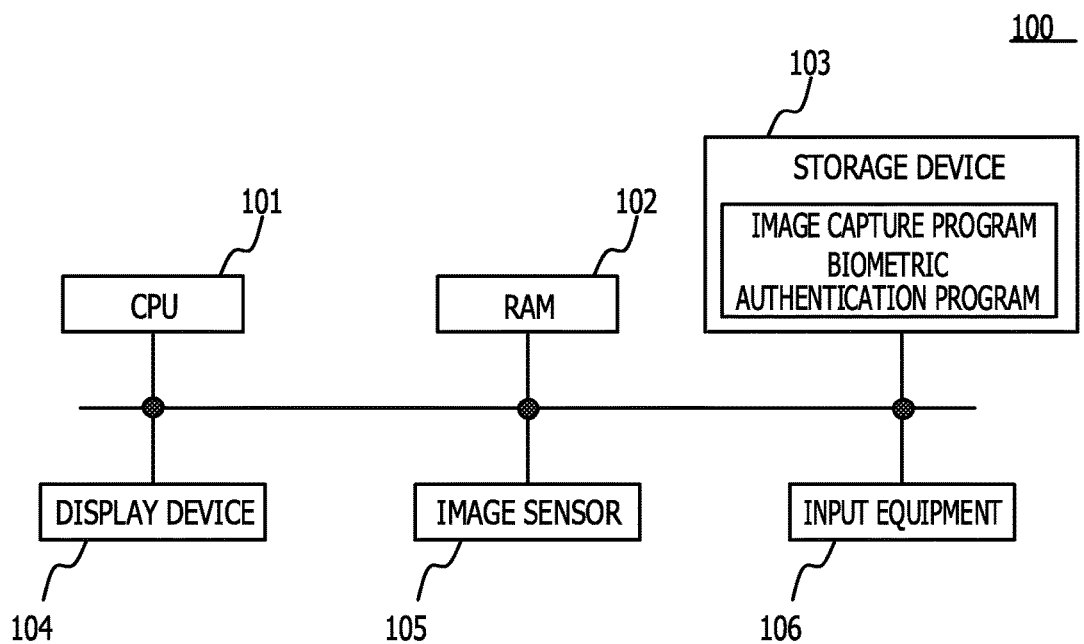
FIG. 1A is a block diagram for describing hardware configuration in a biometric authentication apparatus according to Embodiment 1.

FIG. 1A is a block diagram for describing hardware configuration in a biometric authentication apparatus 100 according to Embodiment 1. Referring to FIG. 1A, the biometric authentication apparatus 100 includes a central processing unit (CPU) 101, a random-access memory (RAM) 102, a storage device 103, a display device 104, an image sensor 105, input equipment 106, and the like.

The CPU 101 is a central processing unit. The CPU 101 includes one or more cores. The RAM 102 is volatile memory for temporarily storing a program to be executed by the CPU 101, data to be processed by the CPU 101, and the like. The storage device 103 is nonvolatile memory. Examples usable as the storage device 103 can include a read-only memory (ROM), a solid-state drive, such as flash memory, and a hard disk driven by a hard disk drive. The storage device 103 stores an image capture program and a biometric authentication program.

Examples of the display device 104 can include a liquid crystal display and an electroluminescent panel. The display device 104 can display instructions to a user, results of image capture processing and biometric authentication processing, which are described below, and the like. The image sensor 105 may be any device capable of acquiring a biometric image by capturing an image of a subject in a noncontact manner and is not particularly limited. One example of the image sensor 105 may be a complementary metal-oxide semiconductor (CMOS) camera. In the present embodiment, the image sensor 105 acquires an image of a palm of a user as one example. The input equipment 106 may be equipment, such as a keyboard or a touch panel.

Figure 1B:
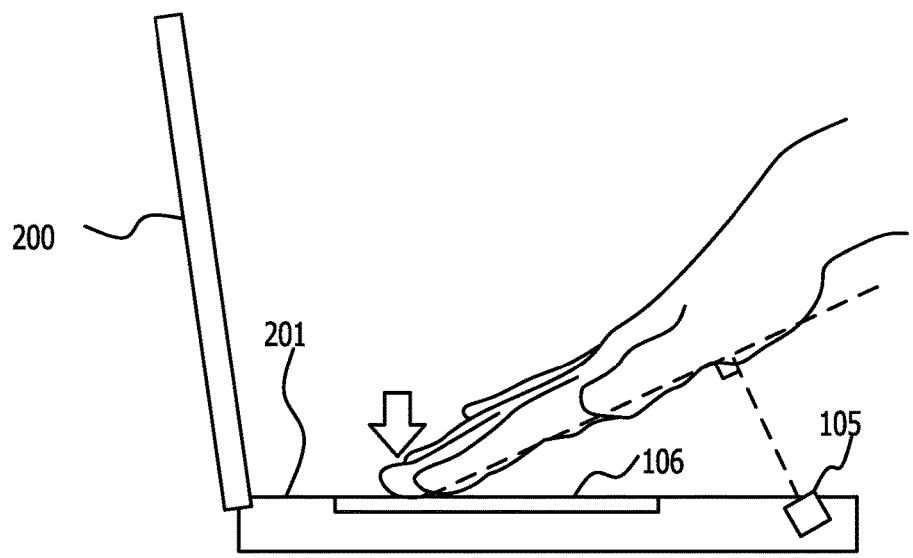
FIG. 1B illustrates an example apparatus in which the biometric authentication apparatus is incorporated.

FIG. 1B illustrates an example apparatus in which the biometric authentication apparatus 100 is incorporated. The biometric authentication apparatus 100 can be incorporated in a terminal 200 as one example. One example of the terminal 200 may be mobile equipment, such as a notebook personal computer or a tablet terminal. Referring to FIG. 1B, the image sensor 105 is provided to a surface of a casing of the terminal 200. The image sensor 105 can be provided to a surface 201 of the terminal 200 in which the input equipment 106, such as a keyboard or a touch panel, is disposed. A mounting angle (optical axis) of the image sensor 105 is set obliquely to the surface 201.

The image capture program and the biometric authentication program stored in the storage device 103 is developed in the RAM 102 such that they are executable. The CPU 101 executes the image capture program and the biometric authentication program developed in the RAM 102. The execution performs the image capture processing and the biometric authentication processing in the biometric authentication apparatus 100. The image capture processing is processing of acquiring a biometric image by capturing an image of a subject. The biometric authentication processing is processing of identifying an authorized user by checking feature data for use in checking obtained in authentication against registered feature data, which was registered in advance.

Figure 2:
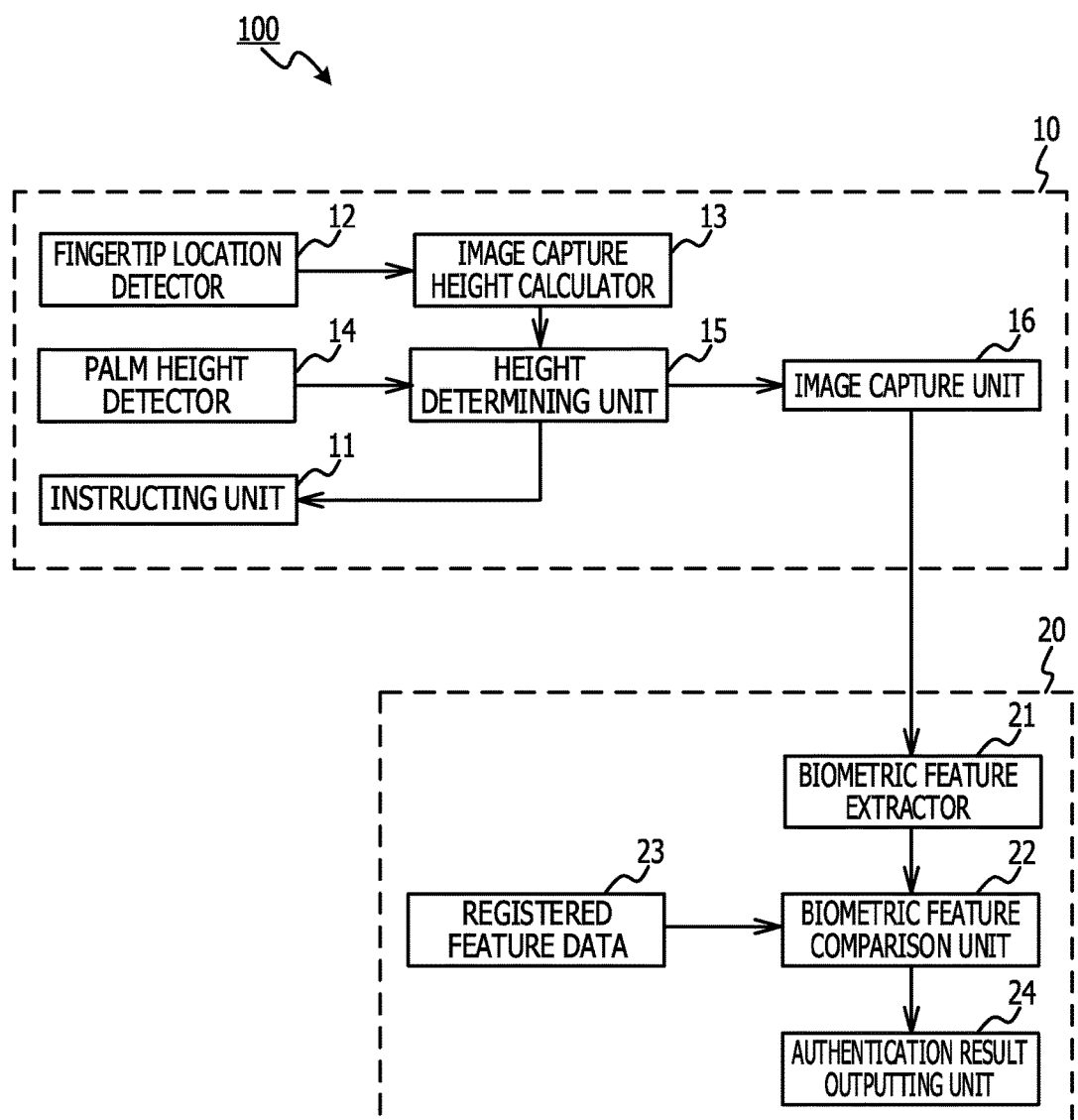
FIG. 2 is a block diagram of functions achieved by execution of an image capture program and a biometric authentication program.

FIG. 2 is a block diagram of functions achieved by execution of the image capture program and the biometric authentication program. The execution of the image capture program achieves an image capture device 10 and an authentication device 20 in the biometric authentication apparatus 100. The image capture device 10 functions as an instructing unit 11 configured to provide an instruction, a fingertip location detector 12 configured to detect a location of a fingertip, an image capture height calculator 13 configured to calculate a height in image capture, a palm height detector 14 configured to detect the height of a palm, a height determining unit 15 configured to determine a height, and an image capture unit 16 configured to capture an image. The authentication device 20 functions as a biometric feature extractor 21 configured to extract a biometric feature, a biometric feature comparing unit 22 configured to perform comparing, a registered feature data storage unit 23 configured to store the registered feature data, and an authentication result outputting unit 24 configured to output a result of authentication.

Next, a preferred value of the mounting angle (optical axis) of the image sensor 105 is described. In the present embodiment, an image is captured in an attitude in which a fingertip is in contact with the surface 201 and the palm is raised. That is, the palm is held obliquely to the surface 201. Thus the image sensor 105 may preferably be mounted such that its optical axis is orthogonal to the palm. At that time, the palm may preferably be positioned within the sensor field of view of the image sensor 105. Examples of those conditions will be described below.

Figure 3A:
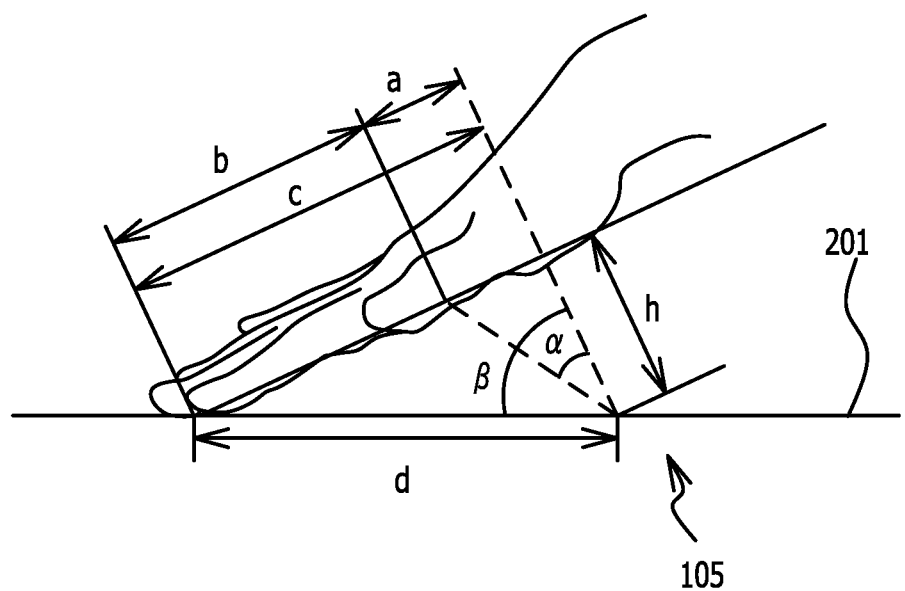
FIGS. 3A and 3B are illustrations for describing a height of a palm.

Referring to FIG. 3A, the distance from a fingertip to the center of the sensor surface of the image sensor 105 (center of the optical axis) on the surface 201 is defined as distance d, the distance from the sensor surface of the image sensor 105 to the palm is defined as height h, and the length of the palm is defined as $2a$. One example of the length of the palm may be the distance from the base of the hand to the base of the middle finger. The length of the finger being in contact with the surface 201 is defined as b. One example of b may be the length of the middle finger. The sum of "a" and b is defined as c. Because "a" indicates one-half of the length of the palm, c indicates the distance from the fingertip being in contact with the surface 201 to the center of the palm. The angle of view of the optical axis of the image sensor 105 is defined as $2\alpha$. The angle between the surface 201 and the optical axis of the image sensor 105 is defined as angle $\beta$.

To position the palm within the sensor field of view, the angle $\beta$ may preferably satisfy the following Expression (1).

$$\beta = \tan^{-1}\{(a+b)/h\} \quad (1)$$

When in Expression (1) the height h is a height at which an image can be taken using the image sensor 105 with the angle of view, $2\alpha$, such that the palm length $2a$ is within the sensor field of view, the following Expression (2) is established.

$$h = a/\tan \alpha \quad (2)$$

When the above Expression (2) is substituted into the above Expression (1), the angle $\beta$ can be determined from the following Expression (3).

$$\beta = \tan^{-1}\{(a+b) \times \tan \alpha / a\} \quad (3)$$

The image sensor 105 may preferably be arranged such that the angle $\beta$ satisfies the above Expression (3).

The palm length $2a$ may preferably be designed so as to suit expected users. For example, according to Anthropometric Database 1991-92 in National Institute of Advanced Industrial Science and Technology (AIST) (http://riodb.ibase.aist.go.jp/dhbodydb/91-92/), about the palm length (Item L2), the average value for adult males is 11.3 cm and that for elderly people is 11 cm. For example, when the sensor angle of view $2\alpha$ is 80°, the palm size $2a$ is 11 cm, and the finger length b is 8 cm, the angle $\beta$ is 66°. In actuality, if $\alpha$ is strictly set, the apparatus is susceptible to positional displacement. Thus adjustment for setting a height at which an image in a range slightly larger than the palm size $2a$ can be taken may preferably be carried out. For example, when a margin of 1 cm is set, the angle $\beta$ may be determined by applying a'=a+1 and b'=b−1 to the above Expression (3).

Next, an index point set on the surface 201 is described. In the present embodiment, the location of a fingertip when the palm is placed on the image sensor 105 with reference to an index point in the vicinity of the image sensor 105 is detected, and when the palm is isolated upward while the fingertip remains on the surface 201 and the palm is raised up to a proper distance, an image is captured. Because users hold their palms relative to the index point, the index point may preferably be easy to identify for them. One example of the index point may be the center of the palm. In actual use, the center of the palm may not be used as the index point. For example, the base of the thumb or the like may also be used. In that case, the index point is determined as a relative location to the center of the palm, and it may be indicated on the surface 201 by marking or the like. If a location significantly remote from the center is selected, an error in detection is large. Thus the center of the palm may be preferable as the index point.

Figure 3B:
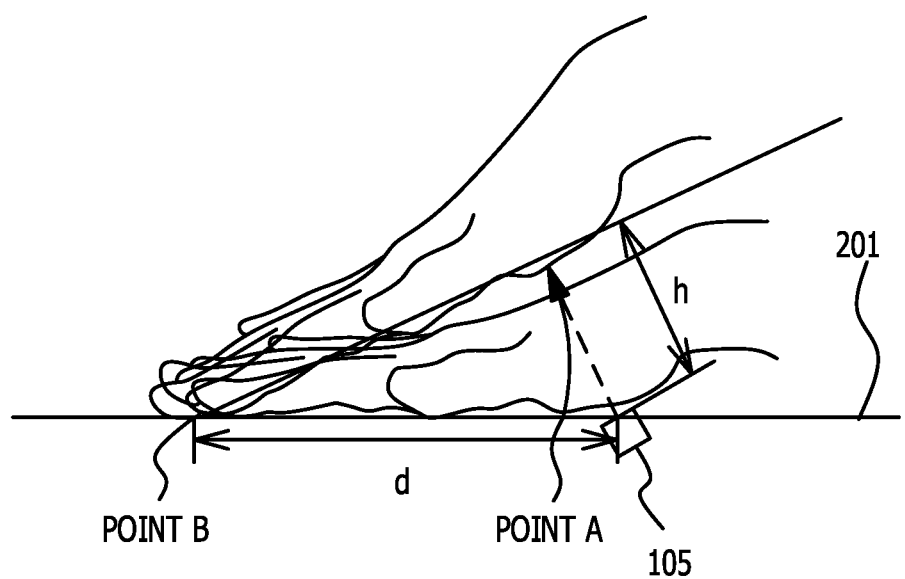

As in FIG. 3B, the state where the surface of the palm is orthogonal to the optical axis of the image sensor 105 may be preferable for a proper image taking location. In that case, it may be preferable that the palm is properly positioned within the field of view of the image sensor 105. That is, it may be preferable that the center of the optical axis of the image sensor 105 and the center of the palm coincide with each other. The location of the center of the palm when the palm pivots about the fingertip point B being in contact with the surface 201 such that the palm comes into contact with the surface 201 is defined as an index point A. Indicating the index point A on the surface 201 (displaying it on a screen, inscribing or printing it on a casing, and the like) facilitates operations. If the index point A is sufficiently near the sensor center and the sensor field of view is set with a margin, the image sensor 105 itself may be used in place of the mark.

Figure 4:
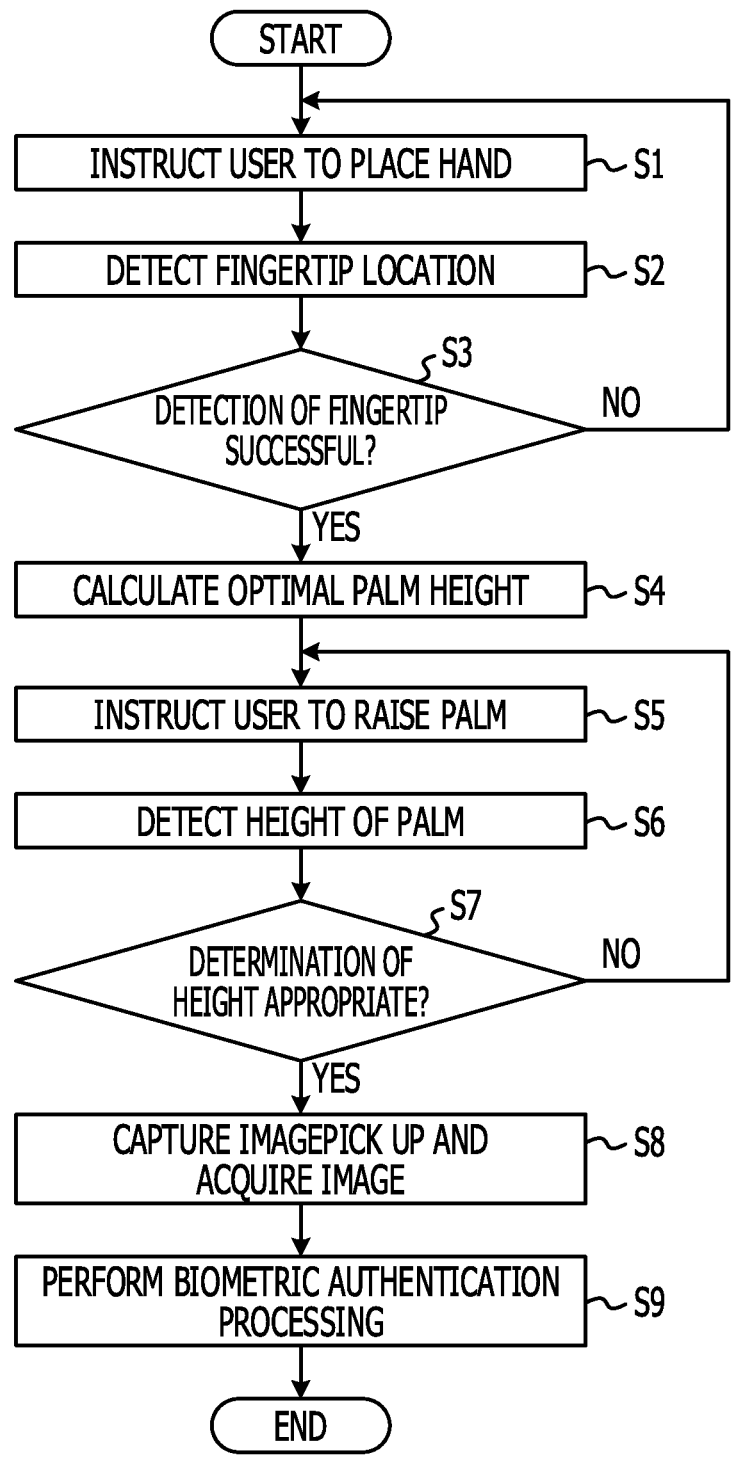
FIG. 4 is an illustration for describing an example flowchart of a process performed by the biometric authentication apparatus.

Next, actions of the biometric authentication apparatus 100 are described. FIG. 4 is an illustration for describing an example flowchart of a process performed by the biometric authentication apparatus 100. In the flowchart in FIG. 4, steps S1 to S8 indicate the image capture processing performed by the image capture device 10, and step S9 indicates the biometric authentication processing performed by the authentication device 20. Referring to FIGS. 2 and 4, the instructing unit 11 instructs a user to place his or her hand on the surface 201 using the index point A as a marker (step S1). Specifically, the instructing unit 11 displays a message to the user on the display device 104. When the center of the palm is used as the index point A, the instructing unit 11 instructs the user to place his or her hand on the surface 201 with the target of coincidence between the index point A and the center of the palm.

Then, the fingertip location detector 12 detects the location of the fingertip (step S2). Then, the fingertip location detector 12 determines whether the detection of the fingertip has succeeded (step S3). When "No" is determined in step S3, the processing from step S1 is performed again. Referring to FIG. 1B again, when the image sensor 105 is incorporated in a palm rest portion of the terminal 200, for example, the fingertip comes into contact with the keyboard. When the palm is raised such that the fingertip acts as a pivot, the finger naturally depresses a specific key. The fingertip location detector 12 determines the location of the fingertip in accordance with the depressed key in the input equipment 106. Because the size of one key is approximately 1 cm, an error of approximately ±1 cm may occur. If two depressed keys are detected, the midpoint between the two keys can be determined to be the location of the fingertip, and an error is approximately ±0.5 cm. That degree of error is not so large in using the biometric authentication apparatus 100.

When the terminal 200 is a tablet terminal, the location of the fingertip can be detected more easily. In that case, because a touch panel is used as the input equipment 106, the location with which the fingertip is in contact can be detected accurately. In that case, the image sensor 105 can be implemented below the screen. As described above, a dedicated sensor can be used to detect the location of the fingertip. The dedicated sensor is optional.

Figure 5A:
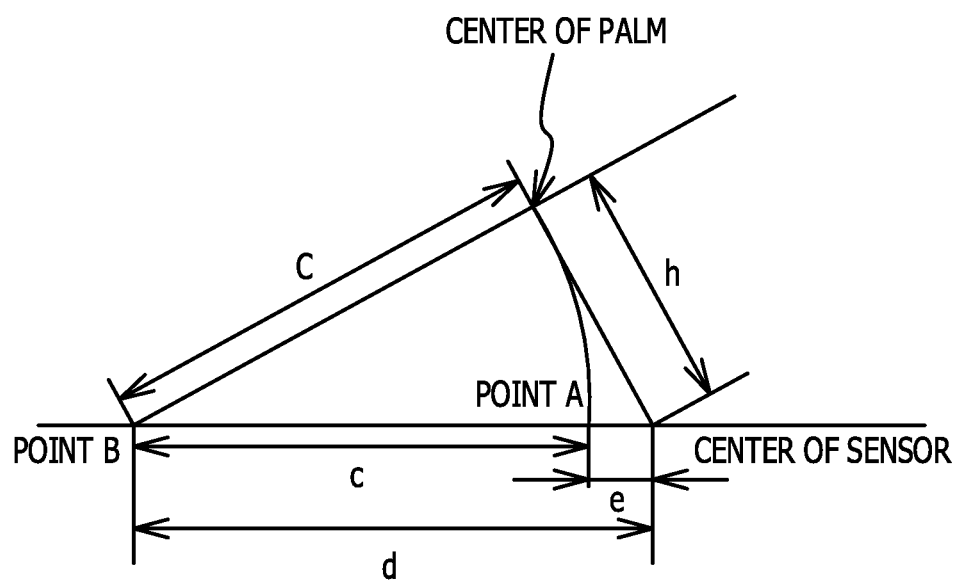
FIG. 5A is an illustration for describing a height of a palm.

Referring to FIGS. 2 and 4 again, when "Yes" is determined in step S3, the image capture height calculator 13 calculates an optimal height of the palm (step S4). FIG. 5A is an illustration for describing an example of the optimal height of the palm. The optimal height h is determined in accordance with the angle of view 2α of the image sensor 105, as previously described. In the present embodiment, it is determined from the fingertip location point B. When the palm is held at the optimal height h, as illustrated in FIG. 5A, a triangle formed among the fingertip location point B, the sensor center of the image sensor 105, and the center of the palm is a right-angled triangle. Accordingly, the following relationship is established.

$$h=\sqrt{(d^2-c^2)} \quad (4)$$

where c is the one in which a distance e between the index point A and the sensor center is subtracted from the distance d. Because the index point A is a fixed point on the surface 201, the distance e is also a fixed value. Accordingly, the optimal height h can be represented as the following Expression (5).

$$h=\sqrt{(d^2-(d-e)^2)} \quad (5)$$

Referring to FIGS. 2 and 4 again, after step S4, the instructing unit 11 instructs the user to raise the palm while the fingertip remains on the surface 201 (step S5). Specifically, the instructing unit 11 displays a message to the user on the display device 104. Then, the palm height detector 14 detects the height h of the palm (step S6). Various techniques can be used as a method of determining the height h of the palm using the image sensor 105. One example technique is the one of emitting spot light parallel with or substantially parallel with the optical axis of the image sensor 105 to a subject and determining the height h of the palm based on a location of the spot light in an obtained image (for example, Japanese Patent No. 4644540).

Then, the height determining unit 15 determines whether the height h of the palm detected in step S6 is within an appropriate range (step S7). The appropriate range can be set at a certain range including the optimal height h represented by the above Expression (5). For example, the appropriate range can be set at a range whose center is the optimal height h. When "No" is determined in step S7, the processing from step S5 is performed again. When "Yes" is determined in step S7, the image capture unit 16 instructs the image sensor 105 to capture an image and acquires the image (step S8).

Then, the authentication device 20 performs the biometric authentication processing (step S9) using the image acquired in step S8. Specifically, the biometric feature extractor 21 extracts a biometric feature from the image. When the palm is used as the subject, veins in the palm, a palm print, an outline, and the like can be used as the biometric feature. Then, the biometric feature comparing unit 22 calculates the degree of similarity between the registered feature data registered in the registered feature data storage unit 23 and the biometric feature extracted by the biometric feature extractor 21. When the degree of similarity is at or above a threshold value, the biometric feature comparing unit 22 determines that the checking is successful. The result of the checking by the biometric feature comparing unit 22 is output to the display device 104 by the authentication result outputting unit 24. When the above processing is completed, the execution of the process of the flowchart ends.

According to the present embodiment, because the fingertip is in contact with the surface 201, the location of the palm to the front, rear, right, and left is stable. In addition, because the palm is isolated upward while the fingertip is in contact with the surface 201, the height of the palm is stable. Because an image is captured when the distance between the subject and the image sensor 105 meets a criterion established based on the distance between the location of the fingertip and the image sensor 105 and the distance between the index point A and the image sensor 105, the inclination of the palm is stable. Consequently, the reproducibility in inputting biometric information can be improved. This can suppress a reduction in authentication accuracy.

The inclination in horizontal directions is easily visible and thus can be easily stabilized originally. It can be expected that this inclination is further stabilized by placement of the fingertip. As for the accuracy, it can be expected that the stable attitude leads to high reproducibility in acquired images and to a reduced false rejection rate. In addition, it can be expected that advantages for the speed (processing time) are also obtainable. It can be expected that the stable attitude allows processing for correcting the attitude to be omitted and thus leads to a reduced calculation time desired for authentication processing. Because finding the location is clear and an operation method is simple, one of the most promising advantages is a reduction in the time desired for operation by a user. If an unaccustomed user operates the apparatus in accordance with instructions, the operation may take several tens of seconds because he or she gradually makes the attitude effective by trial and error. In contrast, when the technique of the present embodiment is used, the user has only to place his or her hand and then raise the palm, so that image capture is completed in several seconds.

Figure 5B:
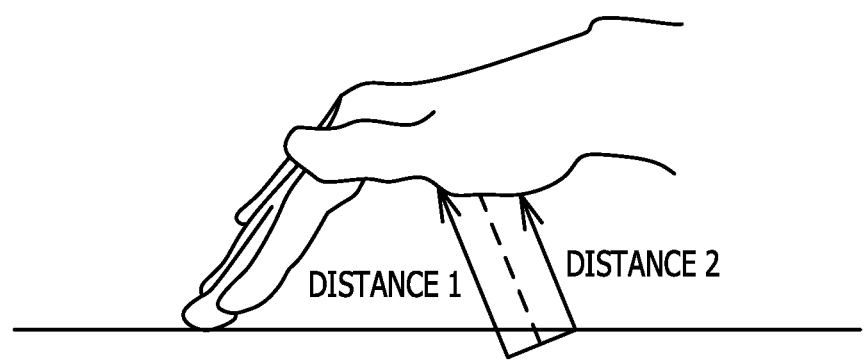
FIG. 5B is an illustration for describing bending of the palm.

The height determining unit 15 may detect the attitude of a subject in accordance with measurement of the distances between the surface of the palm and the sensor surface of the image sensor 105 at a plurality of sites. For example, as illustrated in FIG. 5B, a state where the palm is raised while being bent can be detected. In the present embodiment, it may be preferable that an image be captured in a state where the fingertip is in contact with the surface 201 and the palm extends. However, depending on the user, the palm may be raised while the hand is bent. In that case, the instructing unit 11 may output an alert using the display device 104 or the like when a detected attitude does not meet a certain condition. For example, when the height determining unit 15 determines that the difference between two or more detected distances is at or above a threshold value, the instructing unit 11 may display an alert that indicates the possibility of bending on the display device 104 and may prompt the user to stretch his or her palm.

Figure 6A:
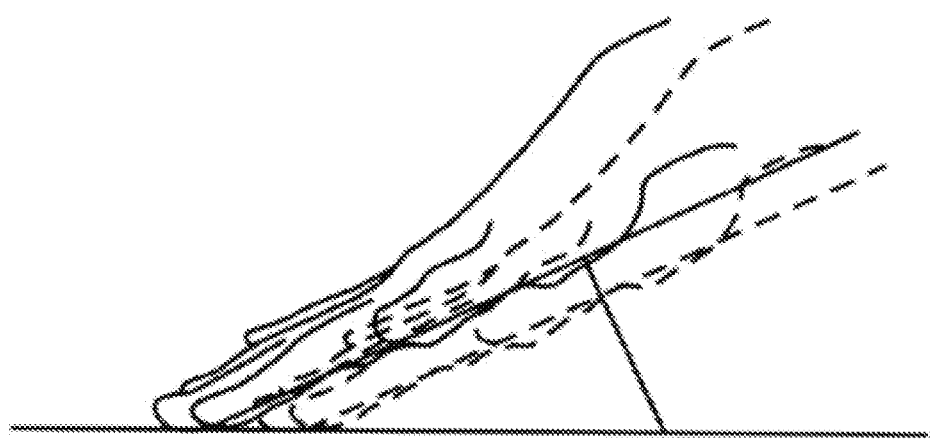
FIGS. 6A and 6B are illustrations for describing an index point.

As described above, in the present embodiment, the fingertip location point B can be determined by placement of the user's hand with reference to the index point A. The index point A in FIG. 5A is in the location by the distance c from the fingertip location point B, and its optimal location is dependent on the size of the hand. Thus, design may preferably be based on a standard hand size. The average size of the palm for adults is 11.3 cm, and the average length of the middle finger is 7.96 cm (according to the above-mentioned Anthropometric Database in AIST). Thus, the average length c from the center of the palm to the fingertip is $11.3/2+7.96=13.61$ cm. As discussed in the above Expression (1), when the mounting angle of the image sensor 105 is 66°, the distance d is 14.9 cm, and thus e is 1.3 cm. A case where this setting condition is used in persons having different hand sizes is discussed below. Because the center of the palm is placed in the same location, the location of the fingertip shifts toward the sensor, and the hand is held in a manner indicated by the broken lines in FIG. 6A.

Figure 6B:
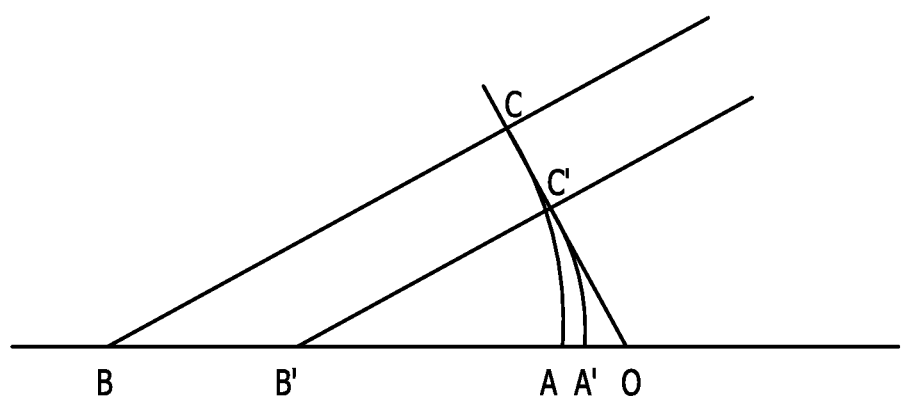

In the discussion up to here, it is intended that the center of the palm when the hand is held coincide with the center of the optical axis. However, as illustrated in FIG. 6B, the index point A, where the hand has to be initially placed, varies with the size of the hand. In the case of a standard hand size, when the center of the palm is placed on the index point A and the palm is raised such that the fingertip location point B acts as a pivot, the center of the palm coincides with the center of the optical axis of the image sensor 105 at a certain height. However, in the case of a person with small hands, to make the center of the palm coincide with the center of the optical axis, it may be preferable that his or her hand be initially placed on a point A'. However, it is impossible to determine an optimal index point (location of the marker) if the size of the hand of the user is not known in advance. Thus, because the index point determined from the standard size is used as a representative value, as described in the above Expression (2), in the case of the person with small hands, the fingertip is placed in a location displaced from B' toward B by the length between A and A'. Accordingly, an image is captured in a location slightly higher than the optimal location.

The distance e between the sensor center O of the image sensor 105 and the index point A meets the relationship of the following Expression (6), where the distance between the index point A and the fingertip location point B is c. That is, the distance between the index point A and the sensor center O of the image sensor 105 reduces with a reduction in the height h, that is, with an increase in the angle of view α.

$$e=\sqrt{(c^2-h^2)}-c \quad (6)$$

In the case where hands with different sizes are used, when the distance c' between B' and C' is k×c, the distance e' between O and A' is k×e, and thus the difference Δ between A and A' is $(1-k)\times e$. As calculated above, when the average hand size for adult males is used as the standard, e is 1.3 cm. The minimum value of the palm length for adults (females) is 8.7 cm and that of the finger length is 6.2 cm. Thus, $c=8.7/2+6.2=10.55$ cm. From $k=0.78$, $\Delta=0.29$ cm. Hence, the finger is placed in a location displaced toward the fingertip location point B by 0.29 cm. This is no more than 3 mm, can fall within the range of variation occurring in placement of the hand, and thus causes no problem.

Image capture is discussed below for a better understanding. The field of view shifts by $\Delta \times \sin\beta$ and an image is taken in a location higher by $\Delta \times \sin\mu$. Thus, if there is no margin, the region on the finger side of the palm may lack by $\Delta(\sin\beta-\sin\alpha)$. In the case of an example design in the above Expression (1), because α is 40° and β is 66°, the range of the lack is 0.078 cm, which is no more than 1 mm, and the effects are very small. Therefore, if there is a margin in the field of view, no problem arises. In contrast, in the case of a large hand, the maximum value of the palm size (for males) is 13.1 cm, that of the finger length is 9 cm, $c=13.1/2+9=15.55$ cm. From $k=1.14$, $\Delta=0.18$ cm. Thus, the hand is placed in a location remote from the point B by 0.18 cm. This difference is on the order of 2 mm, and the effects are smaller than those in the previous discussion, and there is no problem.

In the above-described examples, the fingertip is in contact with the surface 201, and the palm is raised such that the point of contact acts as a pivot. The embodiment is not limited to the above examples. For example, the base of the palm may be in contact with the surface 201, and the fingers and the palm may be raised such that the point of contact acts as a pivot. The way of having the contact between any location of the palm and the surface 201 and raising other portions of the palm such that the point of contact acts as a pivot can stabilize the attitude of the palm. In that case, the mounting angle of the image sensor 105 may preferably be set so as to be substantially orthogonal to the inclination of the palm even if any location is used as the point of contact.

In the above-described examples, the palm is used as a subject for capturing an image in a noncontact manner. The embodiment is not limited to the above examples. For example, another portion, such as a face, may be targeted. In the above-described examples, a request for the location of a subject to a user is displayed on the display device 104. Other informing media, such as sound, may also be used. In the example illustrated in FIG. 4, in step S5, only an instruction to raise the palm is provided to a user. Instructions to the user to lower the palm if the detected height h is large and to raise the palm if the detected height h is small may be provided. The image capture device 10 and the authentication device 20 in the above-described examples may be configured as dedicated circuits or the like.

In the above-described examples, the fingertip location detector 12 functions as a detector configured to detect a location where a surface of a casing and a subject are in contact with each other. The height determining unit 15 functions as an image capture controller configured to perform control such that an image is captured when a distance between the subject and a sensor meets a certain criterion and functions as an attitude detector configured to detect an attitude of the subject by detecting the distances between the surface of the casing and the subject at a plurality of sites. The instructing unit 11 functions as an outputting unit configured to output an alert when the attitude detected by the attitude detector does not meet the certain condition.

The embodiment of the present disclosure is described above. The present disclosure is not limited to a particular embodiment, and various modifications and changes may be made within the scope of the disclosure as defined in the claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An image capture device comprising:
    a casing;
    an image sensor provided to a surface of the casing; and
    a processor configured to:
        detect a location at which a second portion of a subject is in contact on the surface, and
        cause the image sensor to perform image capture when it is determined that a distance between a first portion of the subject and the image sensor meets a certain criterion, the first portion being different from the second portion of the subject, the first portion being not in contact with the surface, the second portion being in contact with the surface at the location,
    wherein the certain criterion is determined by using both first distance information and second distance information, the first distance information indicating a first distance between a specific point and the image sensor, the specific point being located at a static position of the surface, the static position being different from a position of the image sensor, the second distance information indicating a second distance between the detected location on the surface and the image sensor.

2. The image capture device according to claim 1, wherein the subject is a body part of a user,
    wherein the processor is further configured to instruct the user to place the second portion of the subject on the surface using an index provided on the detected location as a mark.

3. The image capture device according to claim 1, wherein the image sensor is embedded in the casing, captures an image in a region above the surface, and has an optical axis extending in a direction inclined to the surface.

4. The image capture device according to claim 1, wherein the processor is further configured to:
    calculate a plurality of distances between the surface and the subject at a plurality of points within the first portion based on image data taken in advance of the image capture,
    detect an attitude of the subject based on the plurality of calculated distances, and
    output an alert when the attitude does not meet a certain condition.

5. The image capture device according to claim 1, wherein the second portion is a finger, and the first portion is a palm.

6. A biometric authentication apparatus comprising:
    a casing;
    an image sensor provided to the casing; and
    a processor configured to:
        detect a location at which a second portion of a subject is in contact on the surface,
        cause the image sensor to perform image capture when it is determined that a distance between a first portion of the subject and the image sensor meets a certain criterion, the first portion being different from the second portion of the subject, the first portion being not in contact with the surface, the second portion being in contact with the surface at the location, and
        perform authentication using biometric information extracted from data of a first image captured by the image capture,
    wherein the certain criterion is determined by using both first distance information and second distance information, the first distance information indicating a first distance between a specific point and the image sensor, the specific point being located at a static position of the surface, the static position being different from a position of the image sensor, the second distance information indicating a second distance between the detected location on the surface and the image sensor.

7. The biometric authentication apparatus according to claim 6, further comprising:
    a keyboard disposed in the surface,
    wherein the location where the surface and the second portion are in contact with each other is detected based on a depressed location in the keyboard.

8. The biometric authentication apparatus according to claim 6, further comprising:
    a touch panel disposed in the surface,
    wherein the location where the surface and the second portion are in contact with each other is detected based on a location where the second portion of the subject is in contact with the touch panel.

9. The biometric authentication apparatus according to claim 6, wherein the second portion is a finger, and the first portion is a palm.

10. An image capture method executed by a computer including a casing and an image sensor provided to the casing, the image capture method comprising:
    detecting a location at which a second portion of a subject is in contact on the surface; and
    causing the image sensor to perform image capture by a processor when it is determined that a distance between a first portion of the subject and the image sensor meets a certain criterion, the first portion being different from the second portion of the subject, the first portion being not in contact with the surface, the second portion being in contact with the surface at the location,
    wherein the certain criterion is determined by using both first distance information and second distance information, the first distance information indicating a first distance between a specific point and the image sensor, the specific point being located at a static position of the surface, the static position being different from a position of the image sensor, the second distance information indicating a second distance between the detected location on the surface and the image sensor.

11. The image capture method according to claim 10, wherein the subject is a body part of a user,
wherein the image capture method further comprises instructing the user to place the second portion of the subject on the surface using an index provided on the detected location as a mark.

12. The image capture method according to claim 10, wherein the image sensor is embedded in the casing, captures an image in a region above the surface, and has an optical axis extending in a direction inclined to the surface.

13. The image capture method according to claim 10, further comprising:
calculating a plurality of distances between the surface and the subject at a plurality of points within the first portion based on image data taken in advance of the image capture;
detecting an attitude of the subject based on the plurality of calculated distances; and
outputting an alert when the attitude does not meet a certain condition.

14. The image capture method according to claim 10, wherein the second portion is a finger, and the first portion is a palm.

15. The image capture device according to claim 1, wherein a center of an optical axis of the image sensor matches a direction orthogonal to a surface of the subject defined by the first portion and the second portion.

16. The image capture device according to claim 15, wherein the image sensor is directed diagonally to the surface of the casing in a state that the center of the optical axis of the image sensor matches a direction orthogonal to a surface of the subject defined by the first portion and the second portion.

17. The image capture device according to claim 1, wherein
the certain criterion is a range of distance calculated based on the first distance information and the second distance information so that an optical axis of the image sensor corresponds to a direction orthogonal to a line defined by the first portion and the second portion when it is determined that the distance between the first portion and the image sensor meets the certain criterion.

* * * * *